March 10, 1964 W. CIRKLER ETAL 3,124,478
METHOD FOR MAKING A BARRIER LAYER CAPACITOR
Filed July 18, 1960
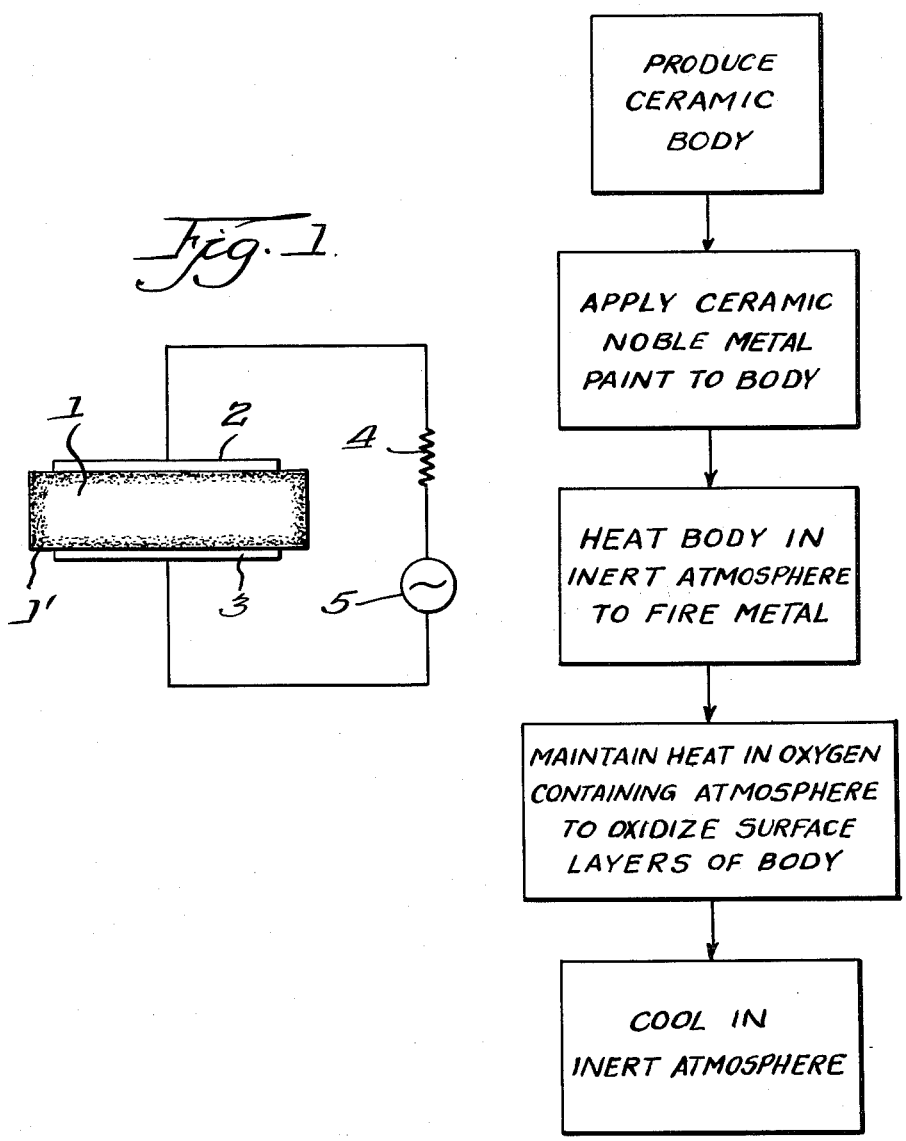

United States Patent Office 3,124,478
Patented Mar. 10, 1964

3,124,478
METHOD FOR MAKING A BARRIER LAYER CAPACITOR
Werner Cirkler and Harald Löbl, Munich, and Gerhard Langbein, Darmstadt, Germany, assignors to Siemens & Halske Aktiengesellschaft, Berlin and Munich, a corporation of Germany
Filed July 18, 1960, Ser. No. 43,644
Claims priority, application Germany July 21, 1959
3 Claims. (Cl. 117—200)

This invention is concerned with a barrier layer capacitor having a high dielectric constant, comprising a dielectric ceramic body produced by reduction.

There are capacitors known, comprising a ceramic dielectric made of ferroelectric material with high dielectric constant, for example, barium titanate. The operation of such reduction capacitor, the Curie temperature of which lies preferably above the working temperature range, is based upon the fact that the reduction of the ceramic body and the kind of coating or plates provided thereon produces between the coatings and the ceramic body a resistance which is dependent upon the direction of the voltage connected thereto. It is assumed, for an explanation of this directional dependence of the resistance between the coatings and the ceramic body which had been made conductive by reduction, that there is formed upon the surface of or in parts of the ceramic body adjacent to the surface thereof, a socalled barrier layer responsive to connection of a properly polarized voltage.

It is known to construct capacitors of this type by providing a coating, for example, upon each side of a diskshaped ceramic dielectric. Since the ceramic body which has been made n-conductive by the reduction, must be at the barrier voltage which is to be connected, positively biased wtih respect to the coating, only one of the two barrier layers between the body and the two coatings will be active in each half wave of an alternating voltage connected thereto, while the other barrier layer is circuited in current flow direction. The structure therefore operates in both half waves of the connected alternating voltage as a capacitor.

The object of the invention is to make the resistance which operates in the barrier direction like a resistance connected in parallel to the capacitance, as high as possible, while at the same time keeping the loss angle of the ceramic capacitor small. Another object is to increase the breakdown voltage of the capacitor.

These objects are according to the invention realized by raising the oxygen content on the surface and throughout parts adjacent to the surface of the ceramic body which had been produced by reduction, and which may be diskshaped or tubular shaped, by tempering in an oxygen containing atmosphere, so that the ceramic body has, in the layer underneath the coatings, a higher oxygen content than in the interior thereof. It has has been found particularly advantageous to effect the supplemental oxidation of the surface of the body and the parts adjacent thereto, incident to the firing-on of the coatings in an oxygen containing atmosphere. The firing-on of the metallic coating can thereby be effected in air; the course of temperature as to time must thereby be very accurately maintained also incident to the initial heating and subsequent cooling. The accurate maintenance of the temperature course causes considerable difficulties in obtaining a consistently uniform reinforcing oxidation of the surface parts of the ceramic bodies. It has been particularly difficult to accurately maintain the depth of the supplemental oxidation which is important for the capacitance of the capacitors to be produced.

In order to avoid these difficulties, the invention proposes in accordance with another feature thereof, to cause different, in part oxidizing, in part reducing or especially inert atmospheres, to act on the ceramic capacitor body during the firing-on of the metal coating, especially a ceramic noble metal coating to be provided thereon.

In a preferred embodiment, the ceramic body produced by reduction is provided with a silver paint and initially heated in an inert gas atmosphere, for example, nitrogen. Upon attaining the firing-on temperature, pure oxygen is caused to flow into the furnace employed, so as to act for an accurately defined time on the surface of the ceramic body. During the subsequent cooling, the furnace is again filled with an inert gas, thereby preventing during this phase further oxidation.

Capacitors produced in accordance with such method have a higher area capacitance as well as higher breakdown strength than those in which the silver coating is fired-on in air. The pure oxygen effects a more uniform supplemental oxidation of the surface layer of the ceramic body in which is formed the barrier layer. Moreover, the resulting capacitors can be harmlessly operated with higher currents than those having coatings which had been fired-on in air. A further advantage of the invention resides in that the initial heating and subsequent cooling intervals to be applied in the production, and during which the ceramic bodies are in an inert gas atmosphere, are not critical, thus allowing for considerable tolerances with respect to these time intervals and at the same time producing capacitors which do not exhibit any considerable deviations in the characteristics thereof.

Moreover, the measures applied according to the invention effect an appreciable increase of the resistance disposed in parallel to the capacitance between the coatings along the surface parts of the ceramic body which had been made conductive by reduction. This will appear from a consideration of the following table, giving the resistance which is obtained in connection with different silvering conditions in air. As will be seen, the undesired parallel resistance rises with the firing-on temperature and therefore also with the supplemental oxidation effected by the increased temperature.

[SILVERING CONDITIONS CAP. WITH KC. PARALLEL THERETO]

| Silvering Conditions | Capacitance at 1 kilocycle, µf. | Resistivity parallel to capacitance, kilo-ohms |
|---|---|---|
| 500° C., 10 min | 0.35 | 100 |
| 600° C., 10 min | 0.32 | 400 |
| 700° C., 10 min | 0.30 | 2,000 |

An advantage of the firing-on according to the invention, with partial oxygen pressure instead of in air, will be apparent from the above table upon considering that the capacitance drop can be appreciably reduced or avoided, owing to the high partial oxygen pressure. This is due to the fact that lower temperatures and/or shorter firing-on time intervals are required for the firing-on in oxygen of high pressure to achieve equally high parallel resistance.

As will be seen, the resistance lying parallel to the capacitance rises during the silvering appreciably with the rise of temperature. This rise is due to the fact that the ceramic body is over its entire surface supplementally oxidized, thereby reducing its conductivity; the shunt resistance formed by the ceramic body between the coatings, which is due to the conductivity of the ceramic body formed along its surface, is now by the additional oxidation during the silvering so considerably increased that it loses its disturbing character.

The invention will now be described with reference to the accompanying drawing, wherein FIG. 1 illustrates a barrier layer capacitor according to the invention connected in an electrical circuit; and FIG. 2 is a flow diagram of the steps employed in making capacitor illustrated in FIG. 1.

Numeral 1 indicates the ceramic body consisting particularly of a highly dielectric ferroelectric material with perowskit structure, for example, barium titanate. Upon producing the ceramic body particular care must be taken that the particle size of the finally sintered and reduced or otherwise conductively conditioned ceramic material amounts at the most to about 5 $\mu$m., especially to only about 1-2 $\mu$m. Upon the diskshaped sintered body 1 are provided the fired-on silver coatings 2, 3, the firing-on being as previously described effected in an oxidizing atmosphere, thereby providing in the shaded surface regions 1' for an oxygen content of the titanate which is higher than that prevailing in the interior of the body. The barrier layers are formed within the surface region 1' responsive to connecting to the capacitor the alternating voltage from the source 5 in a circuit including the load resistor 4. Since the ceramic body 1 has been made n-conductive by the reduction, the barrier layer formed therein underneath the coating 2 will provide a barrier in one half wave of the source 5 and the barrier layer forming underneath the coating 3 will act as a barrier in the other half wave whenever the respective coatings 2 and 3 are negatively polarized with respect to the corresponding counter coating.

In view of the many variables involved as to oxidation, reduction, temperature, partial oxygen pressure, total pressure and the properties desired in the final capacitor, the time during which the oxygen acts on the ceramic body will normally be determined experimentally for any particular circumstance.

More specifically, the time during which the oxygen acts on the ceramic body is affected (a) by the reduction employed for producing the initial ceramic body; (b) by the temperature applied for oxidizing the body in the oxygen-containing atmosphere; (c) by the partial oxygen pressure of this oxygen-containing atmosphere; (d) by the total pressure of this atmosphere; and (e) by the properties of the desired capacitor as to voltage stability and capacitance per cm.²

It will be understood in view of this situation, that the time during which the oxygen acts on the surface of the ceramic body can be accurately determined only by experiments, and that is, therefore, practically impossible to specify this time for the various cases that may occur in the use of the invention.

This will become apparent from the examples given below for the production of a 4 volt 300 mf./cm.² ceramic capacitor employing a barium titanate dielectric, considering the above noted conditions "(a)" to "(e)":

(a) The reduction is effected in a forming gas (nitrogen containing 20 percent hydrogen) at a temperature of 1250° C. for 5 minutes. The heating time amounts to 30 minutes and the cooling time to about 15 minutes.

(b) Example 1: The oxidation is effected in air at a temperature of 700° C. during a time amounting to about 10 minutes. The heating time and likewise the cooling time amounts each to about 10 minutes; or, Example 2: The oxidation is effected in a pure oxygen atmosphere. In order to obtain substantially the same surface capacitance as in Example 1, the oxidation is effected at about 800° C. within about 5 minutes. The heating and the cooling are not carried out in a pure oxygen atmosphere but in a nitrogen atmosphere, that is, in a non-reducing atmosphere which is free of hydrogen. The heating and cooling times are in this latter example of no particular importance.

(c) With a higher partial oxygen pressure, for example, in the treatment in a pure oxygen atmosphere, there is obtained, at identical surface capacitance, a better insulation resistance, as compared with a capacitor dielectric treated in air. The partial oxygen pressure amounts in Example 2 to about twice the pressure resulting in Example 1 (oxidation in air).

(d) The total pressure of the treatment atmosphere amounts in both examples to about normal pressure.

(e) The desired voltage stability of the capacitor obtained in each example will amount at 5 volts to about 2 megohms.

It will be realized from the foregoing examples that the time during which the oxygen acts on the surface of the ceramic body (paragraph "(b)," above) cannot be accurately determined, except by experimentation, as it depends on the previously stated circumstances.

Changes may be made within the scope and spirit of the appended claims which define what is believed to be new and desired to have protected by Letters Patent.

We claim:

1. A method of making a barrier layer capacitor, comprising taking a ceramic body produced by reduction of ferroelectric material with high dielectric constant and perowskite structure, placing upon said body a ceramic noble metal paint to form coatings thereof on said body, heating said body in an inert gas atmosphere to a temperature at which the ceramic noble metal paint is fired thereon, providing an oxygen containing atmosphere, maintaining said firing-on temperature for a period of time in the presence of said oxygen containing atmosphere so as to oxidize the surface layers of said body including the parts thereof which extend underneath said coatings, providing an inert atmosphere, and thereafter cooling said body with said coatings fired thereon in said inert atmosphere.

2. The method according to claim 1, wherein said inert gas atmosphere, applied respectively during the heating and during the cooling of said body, is a nitrogen atmosphere, and wherein said oxygen containing atmosphere applied for the oxidation of the surface layers is a pure oxygen atmosphere.

3. The method according to claim 1, wherein the oxygen content of said oxygen containing atmosphere is higher than the oxygen content of air.

References Cited in the file of this patent

UNITED STATES PATENTS

| | | |
|---|---|---|
| 2,759,854 | Kilby | Aug. 21, 1956 |
| 2,841,508 | Roup et al. | July 1, 1958 |
| 2,922,730 | Feldman | Jan. 26, 1960 |
| 3,028,248 | Malcolm | Apr. 3, 1962 |